United States Patent
Li et al.

(10) Patent No.: US 12,341,568 B1
(45) Date of Patent: Jun. 24, 2025

(54) EFFICIENT SYNTHESIS METHOD FOR RADIATION PATTERN OF CONFORMAL ARRAY ANTENNA

(71) Applicant: Xidian University, Xi'an (CN)

(72) Inventors: Xun Li, Xi'an (CN); Yuanchen Zeng, Xi'an (CN); Jie Wu, Xi'an (CN); Zaipeng Han, Xi'an (CN)

(73) Assignee: Xidian University, Xi'an (CN)

( * ) Notice: Subject to any disclaimer, the term of this patent is extended or adjusted under 35 U.S.C. 154(b) by 0 days.

(21) Appl. No.: 18/991,810

(22) Filed: Dec. 23, 2024

(30) Foreign Application Priority Data

Dec. 25, 2023 (CN) .......................... 202311794802.X (51) Int. Cl.
*H04B 17/391* (2015.01)
*H01Q 21/00* (2006.01)
*H01Q 21/06* (2006.01)

(52) U.S. Cl.
CPC ..... *H04B 17/3912* (2015.01); *H01Q 21/0006* (2013.01); *H01Q 21/061* (2013.01)

(58) Field of Classification Search
CPC .......... H01Q 1/28; H01Q 1/286; H01Q 21/20; H01Q 21/0061; H01Q 21/0006; H01B 17/3912
See application file for complete search history.

(56) References Cited

U.S. PATENT DOCUMENTS

| | | | | |
|---|---|---|---|---|
| 3,699,574 A * | 10/1972 | O'Hara | ..................... | H01Q 3/32 343/705 |
| 6,768,456 B1 * | 7/2004 | Lalezari | ............... | H01Q 21/205 342/373 |
| 7,532,170 B1 * | 5/2009 | Lee | ...................... | H01Q 15/006 343/705 |
| 8,594,735 B2 * | 11/2013 | Huang | ................. | H01Q 3/2605 455/562.1 |
| 9,000,982 B2 * | 4/2015 | Chethik | ................... | H01Q 3/36 342/374 |

(Continued)

OTHER PUBLICATIONS

Girvan at el. "A method for calculating the radiation pattern of a non-planar conformal array", Published in: 6th IEEE High Frequency Postgraduate Colloquium (Cat. No. 01TH8574), Sep. 9-10, 2001 (Year: 2001).*

(Continued)

*Primary Examiner* — Peter M Bythrow
(74) *Attorney, Agent, or Firm* — Hemisphere Law, PLLC; Zhigang Ma (57) ABSTRACT

An efficient synthesis method for a radiation pattern of a conformal array antenna is provided. The method includes: step 1, establishing a field analysis model of the conformal array antenna; determining an aperture field distribution principle suitable for the conformal array antenna, and expanding distribution of an excitation I of an arbitrary curved surface source in a spherical coordinate system according to the aperture field distribution principle; and step 3, establishing an optimization model for the radiation pattern of the conformal array antenna, and performing synthesis of the radiation pattern of the conformal array antenna according to the optimization model. The method greatly improves the synthesis efficiency of a radiation pattern of a conformal array antenna while ensuring that the directional pattern requirements are met.

1 Claim, 9 Drawing Sheets

(56) References Cited

U.S. PATENT DOCUMENTS

| | | | | |
|---|---|---|---|---|
| 9,450,310 B2* | 9/2016 | Bily | ............... | H01Q 15/0006 |
| 9,647,345 B2* | 5/2017 | Hyde | ............... | H01Q 1/28 |
| 9,923,271 B2* | 3/2018 | Hyde | ............... | H01Q 13/28 |
| 2003/0090422 A1* | 5/2003 | Diament | ............... | H01Q 9/045 |
| | | | | 343/700 MS |
| 2012/0268340 A1* | 10/2012 | Capozzoli | ............... | H01Q 21/0018 |
| | | | | 343/912 |
| 2015/0109181 A1* | 4/2015 | Hyde | ............... | H01Q 15/0086 |
| | | | | 343/833 |
| 2018/0358696 A1* | 12/2018 | Shapoury | ............... | H01Q 25/002 |
| 2020/0176889 A1* | 6/2020 | Rojanski | ............... | H01Q 21/067 |
| 2021/0313686 A1* | 10/2021 | Rojanski | ............... | H01Q 21/205 |

OTHER PUBLICATIONS

Hu et al. "Design and Simulation of Conformal Phased Array Antenna", Advances in Computer Science Research, vol. 87, 3rd International Conference on Mechatronics Engineering and Information Technology, (Year: 2022).*

Khan et al. "Radiation Pattern Synthesis in conformal antenna arrays using modified convex optimization technique", International Journal of RF and Microwave computer aided engineering, Sep. 19, 2022 (Year: 2022).*

Pan Hongguang et al., "Thinned Array Antenna Pattern Synthesis with Multiple Constraints Using FFT-PSO Strategy", Telecommunication Engineering, 2017, pp. 1133-1139, vol. 57, No. 10.

Feng Yang et al., "A Novel 3D-NUFFT Method for the Efficient Calculation of the Array Factor of Conformal Arrays", IEEE Transactions on Antennas and Propagation, 2021, pp. 7047-7052, vol. 69, No. 10.

CNIPA, Notification of a First Office Action for CN202311794802. X, Jul. 27, 2024.

Xidian University (Applicant), Replacement claims (allowed) of CN202311794802.X, Aug. 29, 2024.

CNIPA, Notification to grant patent right for invention in CN202311794802.X, Sep. 13, 2024.

* cited by examiner

EFFICIENT SYNTHESIS METHOD FOR RADIATION PATTERN OF CONFORMAL ARRAY ANTENNA

CROSS-REFERENCE TO RELATED APPLICATION

This application claims priority to Chinese Patent Application No. 202311794802.X, filed on Dec. 25, 2023, which is herein incorporated by reference in its entirety.

TECHNICAL FIELD

The disclosure relates to the field of antenna design technologies, particularly to an efficient synthesis method for a radiation pattern of a conformal array antenna.

BACKGROUND

A conformal array antenna, with its flexibility and wide scanning capability, is widely used in wireless communication and radar detection fields. In practical applications, the detection, localization, and tracking capabilities of a conformal array antenna system for a target is enhanced by controlling an excitation amplitude and a phase of each array element of the conformal array antenna, thereby improving the performance and reliability of a corresponding communication system. For large and extra-large conformal array antennas, it is obviously impractical to directly optimize an excitation amplitude and a phase of each array element due to the large computational load and time consumption. Therefore, researching an efficient synthesis method for a radiation pattern has significant engineering application value and practical significance.

Currently, domestic and international research on efficient synthesis methods for radiation patterns mainly involves finding a curve of a controllable parameter to describe an actual aperture field distribution. This approach only requires optimizing the control parameter corresponding to the curve or a surface of the curve, thereby greatly improving the synthesis efficiency of the radiation patterns. For example, Bernstein curves can be used to achieve beamforming for linear arrays. For a planar phased array, it can be assumed that an excitation of the whole array can be separated along a coordinate axis, so that only a Bernstein curve with two sets of controllable parameters is needed to realize efficient synthesis of a radiation pattern of the planar phased array. In addition, there are some planar aperture field distributions for antennas having special shapes, such as parabolic aperture field distribution, which can be used for circular aperture plane array antennas. However, the conformal array antenna is usually a curved three-dimensional array, and the excitation of the whole array cannot be separated, so the direct application of the above methods is greatly limited. Therefore, it is necessary to deeply study a curved array aperture field distribution that can be applied to an antenna having any shape.

SUMMARY

An objective of the disclosure is to provide an efficient synthesis method for a radiation pattern of a conformal array antenna, which can achieve rapid synthesis of the conformal array antenna while meeting the requirements of radiation pattern specification.

An embodiment of the disclosure provides an efficient synthesis method for a radiation pattern of a conformal array antenna, which includes:
step 1, establishing a field analysis model of the conformal array antenna;
step 2, determining an aperture field distribution principle suitable for the conformal array antenna, and expanding distribution of an excitation I of an arbitrary curved surface source in a spherical coordinate system according to the aperture field distribution principle; and
step 3, establishing an optimization model for the radiation pattern of the conformal array antenna, and performing synthesis of the radiation pattern of the conformal array antenna according to the optimization model.

In an embodiment, in the step 1, the field analysis model of the conformal array antenna is expressed by a formula (1):

$$E = \sum_{n=1}^{N} I_n f_n(\theta, \varphi) e^{jk\overrightarrow{T_n r}} \quad (1),$$

where E represents a far-filed of the conformal array antenna; $T_n$ represents a rotation matrix of an n-th array element of N array elements of the conformal array antenna; $f_n(\theta, \varphi)$ represents a polarization component of a vector radiation pattern of the n-th array element in a far-field observation direction $(\theta, \varphi)$; $I_n$ represents a complex excitation of the n-th array element; k represents a spatial propagation constant, k=2/1, A represents a wavelength; $r_n$ represents a position vector of the n-th array element; $\vec{r}$ represents an unit vector of the far-field observation direction $(\theta, \varphi)$; $I_n$ represents an imaginary unit; θ represents an included angle between the far-field observation direction $(\theta, \varphi)$ and a positive position of a coordinate axis z; and o presents an included angle between the far-field observation direction $(\theta, \varphi)$ and a positive position of a coordinate axis x.

In an embodiment, in the step 2, the aperture field distribution principle suitable for the conformal array antenna includes:
a. an excitation distribution function of the arbitrary curved surface source is continuous, because a curved surface corresponding to the arbitrary curved surface source is continuous, the excitation distribution function also is continuous;
b. the excitation distribution function is bounded, because the excitation distribution function has upper and lower limits; and
c. the excitation distribution function is integrable, because an integral of a product of the excitation and a spatial phase term is a field distribution, the excitation distribution function is integrable.

In an embodiment, in the step 2, the expanded distribution of the excitation I of the arbitrary curved surface source in the spherical coordinate system is expressed by a formula (2):

$$I(r, \theta, \varphi) = \sum_{-p}^{p} \sum_{-q}^{q} \sum_{-s}^{s} A_{(p,qs)} \exp\left[j\frac{p\pi r u}{L_x}\right] \exp\left[j\frac{q\pi r v}{L_y}\right] \exp\left[j\frac{s\pi r w}{L_z}\right], \quad (2)$$

where r represents a distance between any point on the arbitrary cured surface source and a coordinate origin of the spherical coordinate system; $L_x$, $L_y$ and $L_z$ represent projection lengths of the arbitrary cured surface source on coordinate axes x, y, and z of the spherical coordinate system, respectively; u=sin θ cos φ, v=sin θ sin φ, and w=cos θ; and a (p, q, s)-th Fourier expansion coefficient is $A_{(p,q,s)}$.

In an embodiment, in the step 3, the optimization model for the radiation pattern of the conformal array antenna is expressed by a formula (3):

Find $A = [A_{(1,1,1)}\ A_{(p,q,s)} \cdots A_{(P,Q,S)}]$

Min. $f(A) = 10\ \log|E - E_{tar}|$

S.T. $A \in [\overline{A}, \underline{A}]$ (3), where A represents a vector composed of the Fourier expansion coefficient A (p,q,s); P, Q and S respectively represent total numbers of Fourier expansion coefficients along the coordinate axes x, y, and z; $\overline{A}$ and $\underline{A}$ represent upper and lower limits of a control parameter respectively; and $E_{tar}$ represents a target field;

the performing synthesis of the radiation pattern of the conformal array antenna according to the optimization model includes:
  substituting the vector composed of the Fourier expansion coefficient $A_{(p,q,s)}$ into the formula (2) to obtain the excitation I of the arbitrary curved surface source;
  performing discretization on the excitation/of the arbitrary curved surface source to thereby obtain the complex excitation $I_n$ of the n-th array element; and
  substituting the complex excitation $I_n$ of the n-th array element into the formula (1) to obtain a far-field E of the conformal array antenna.

The method has at least the following beneficial effects. Firstly, a radiation field analysis model of a conformal array antenna is established by coordinate transformation; secondly, a selection principle of an aperture field distribution function is summarized, and inspired by the idea of Fourier series expansion of waves in nature, and an aperture field distribution function for the conformal array antenna is given; and finally, a comprehensive optimization model of a radiation pattern of the conformal array antenna is established and solved by a quantum particle swarm optimization (QPSO) algorithm.

Further, it should be noted that traditional conformal array antenna pattern synthesis needs to optimize the excitation amplitude and phase of each radiating element, which is time-consuming and laborious for large-scale conformal arrays. The proposed method of the disclosure can greatly reduce the number of optimization design variables, and then improve the optimization efficiency.

DETAILED DESCRIPTION OF EMBODIMENTS

The disclosure will be described in detail with reference to accompanying drawings and specific embodiments.

An efficient synthesis method for a radiation pattern of a conformal array antenna of the disclosure mainly aims at solving the problem of lower synthesis efficiency of a radiation pattern of a curved conformal array, and is realized by selecting appropriate aperture field distribution and carrying out a synthesis research on the radiation pattern of the conformal array antenna based on an intelligent optimization algorithm.

Embodiment 1

The embodiment 1 provides an efficient synthesis method for a radiation pattern of a conformal array antenna, which includes step 1, step 2, and step 3.

In step 1, a field analysis model for the conformal array antenna is established. A specific process of the step 1 is as follows.

Figure 1:
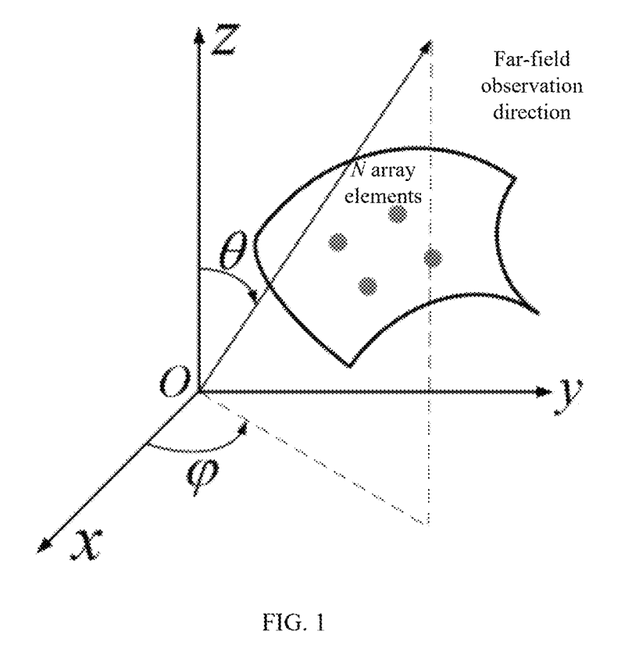
FIG. 1 illustrates a schematic diagram of a conformal array antenna on an arbitrary curved surface according to an efficient synthesis method for a radiation pattern of a conformal array antenna of an embodiment of the disclosure.

N array elements located on a curved surface shown in FIG. 1 is considered, assuming that radiating elements (i.e., the N array elements) are well matched, a far-field E of the conformal array antenna may be obtained by coordinate transformation, and the far-field E is expressed by a formula (1):

$$E = \sum_{n=1}^{N} I_n f_n(\theta, \varphi) e^{jk\vec{r}_n\vec{r}}. \quad (1)$$

In the formula (1), $T_n$ represents a rotation matrix of an n-th array element of the N array elements. The rotation matrix is obtained by two transformation steps: firstly, a far-field observation direction $(\theta, \varphi)$ in a global coordinate system o-xyz is transformed into a local coordinate system $o_n^l\text{-}x_n^l y_n^l z_n^l$ of the n-th array element to obtain a representation $(\theta_n^l, \varphi_n^l)$; and secondly, a radiation pattern function $f_n(\theta_n^l, \varphi_n^l)$ of the n-th array element in the local coordinate system of the n-th array element is transformed into the global coordinate system by coordinate rotation to obtain a representation $f_n(\theta,\varphi)$. The representation $f_n(\theta, \varphi)$ represents a polarization component of a vector pattern of the n-th array element in the far-field observation direction $(\theta,\varphi)$. $I_n$ represents a complex excitation of the n-th array element. k represents a spatial propagation constant, $k=2\pi/\lambda$, and $\lambda$ represents a wavelength. $\vec{r}_n$ represents a position vector of the n-th array element. $\vec{r}$ represents an unit vector of the far-field observation direction $(\theta,\varphi)$. j represents an imaginary unit. $\theta$ represents an included angle between the far-field observation direction $(\theta, \varphi)$ and a positive position of a coordinate axis z. $\varphi$ presents an included angle between the far-field observation direction $(\theta, \varphi)$ and a positive position of a coordinate axis x, as shown in FIG. 1.

Figure 2:
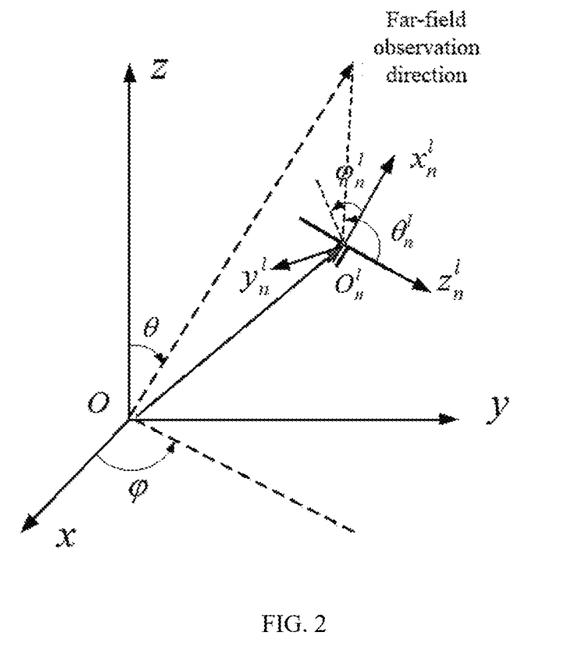
FIG. 2 illustrates a schematic relationship diagram between a local coordinate system and a global coordinate system according to the efficient synthesis method for the radiation pattern of a conformal array antenna of the embodiment of the disclosure.

Radiation patterns of the radiating elements are usually defined in their respective local coordinate systems. Therefore, the key to analyze the far-field of the conformal array antenna is to transform a radiation pattern of each array elements into the global coordinate system, as shown in FIG. 2.

A process for transforming the far-field observation direction $(\theta, \varphi)$ in the global coordinate system o-xyz into the local coordinate system $o_n^l\text{-}x_n^l y_n^l z_n^l$ of the n-th array element to obtain the representation $(\varphi_n^l, \theta_n^l)$ may be represented as $T_{n1}$, which is expressed by a formula (2):

$$T_{n1} = \begin{bmatrix} \sin\theta\cos\varphi & \sin\sin\varphi & \cos\theta \\ \cos\theta\cos\varphi & \cos\theta\sin\varphi & -\sin\theta \\ -\sin\varphi & \cos\varphi & 0 \end{bmatrix} \cdot T_{gtl}. \quad (2)$$

In the formula (2), a first term $$\begin{bmatrix} \sin\theta\cos\varphi & \sin\theta\sin\varphi & \cos\theta \\ \cos\theta\cos\varphi & \cos\theta\sin\varphi & -\sin\theta \\ -\sin\varphi & \cos\varphi & 0 \end{bmatrix}$$

on a right side of the formula (2) represents a matrix used to convert a unit vector in a spherical coordinate system into a unit vector in a Cartesian coordinate system; $T_{gtl}$ represents a transformation matrix from a global Cartesian coordinate system to a local Cartesian coordinate system, which is related to a pose of the n-th array element. It is assumed that the n-th array element is rotated by $\gamma_{zn}$ around a z axis of the global Cartesian coordinate system first, then is rotated by $\gamma_{xn}$ around an x axis of the global Cartesian coordinate system and finally is rotated by $\gamma_{yn}$ around a y axis the global Cartesian coordinate system. $T_{gtl}$ is expressed by a formula (3):

$$T_{gtl} = \begin{bmatrix} \cos\gamma_{yn} & 0 & -\sin\gamma_{yn} \\ 0 & 1 & 0 \\ \sin\gamma_{yn} & 0 & \cos\gamma_{yn} \end{bmatrix} \cdot \begin{bmatrix} 1 & 0 & 0 \\ 0 & \cos\gamma_{xn} & \sin\gamma_{xn} \\ 0 & -\sin\gamma_{xn} & \cos\gamma_{xn} \end{bmatrix} \cdot \begin{bmatrix} \cos\gamma_{zn} & \sin\gamma_{zn} & 0 \\ -\sin\gamma_{zn} & \cos\gamma_{zn} & 0 \\ 0 & 0 & 1 \end{bmatrix}. \quad (3)$$

A process for transforming the radiation pattern function $f_n(\theta_n^l, \varphi_n^l)$ of the n-th array element in the local coordinate system of the n-th array element into the global coordinate system by coordinate rotation to obtain the representation $f_n(\theta, \varphi)$ may be represented as $T_{cts}$, which is expressed by a formula (4):

$$T_{cts} = \begin{bmatrix} \sin\theta_n^l\cos\varphi_n^l & \sin\theta_n^l\sin\varphi_n^l & \cos\theta_n^l \\ \cos\theta_n^l\cos\varphi_n^l & \cos\theta_n^l\sin\varphi_n^l & -\sin\theta_n^l \\ -\sin\varphi_n^l & \cos\varphi_n^l & 0 \end{bmatrix}. \quad (4)$$

As such, the rotation matrix $T_n$ is expressed by a formula (5):

$$T_n = T_{n1} \cdot T_{cts} \quad (5).$$

In step 2, an aperture field distribution principle suitable for the conformal array antenna is determined, and an excitation distribution of an arbitrary curved surface source is expanded in the spherical coordinate system. A specific process of the step 2 is as follows.

Similar to a traditional excitation distribution function, the selection of an excitation distribution function of an arbitrary curved surface source needs follow the following principles:

a. the excitation distribution function is continuous, because a curved surface corresponding to the arbitrary curved surface source is continuous, the excitation distribution function also is continuous;

b. the excitation distribution function is bounded, because the excitation distribution function has upper and lower limits; and c. the excitation distribution function is integrable, because an integral of a product of the excitation and a spatial phase term is a field distribution, the excitation distribution function is integrable.

In nature, complex signals such as acoustic waves and electromagnetic waves can be decomposed into sine wave superposition by Fourier transform. Inspired by this idea, following the above-mentioned "three principles", distribution of the excitation I of the arbitrary curved surface source is expanded in the spherical coordinate system, which is expressed by a formula (6):

$$I(r, \theta, \varphi) = \sum_{-p}^{p} \sum_{-q}^{q} \sum_{-s}^{s} A_{(p,qs)} \exp\left[j\frac{p\pi r u}{L_x}\right] \exp\left[j\frac{q\pi r v}{L_y}\right] \exp\left[j\frac{s\pi r w}{L_z}\right]. \quad (6)$$

In the formula (6), r represents a distance between any point on the arbitrary cured surface source and a coordinate origin of the spherical coordinate system; $L_x$, $L_y$ and $L_z$ represent projection lengths of the arbitrary cured surface source on coordinate axes x, y, and z of the spherical coordinate system, respectively; u=sin θ cos φ, v=sin θ sin φ, and w=cos θ. After the excitation distribution function/of the arbitrary curved surface source is given by the formula (6), shaping of a radiation pattern of the arbitrary curved surface source can be realized by optimizing a Fourier expansion coefficient $A_{(p,q,s)}$, and finally the complex excitation $I_n$ of the n-th array element in the formula (1) can be obtained according to a position coordinate of the n-th array element.

In the step 3, an optimization model shown in a formula (7) is established to realize the synthesis of a radiation pattern of the conformal array antenna:

Find $A=[A_{(1,1,1)} A_{(p,q,s)} \ldots A_{(P,Q,S)}]$

Min. $f(A)=10 \log|E-E_{tar}|$ $S.T. A \in [\overline{A}, \underline{A}]$ (7),

In the formula (7), A represents a vector composed of the Fourier expansion coefficient $A_{(p,q,s)}$; and P, Q and S respectively represent total numbers of Fourier expansion coefficients along the coordinate axes x, y, and z. A design variable is substituted into the formula (6) to obtain the excitation distribution function I of the arbitrary curved surface source, and then the complex excitation $I_n$ of the n-th array element is obtained by discretization of array element positions, and the complex excitation $I_n$ of the n-th array element is substituted into the formula (1) to obtain far-field E. $\overline{A}$ and $\underline{A}$ represent upper and lower limits of a control parameter respectively. $E_{tar}$ represents a target field. A quantum particle swarm optimization (QPSO) algorithm is adopted as an optimization algorithm. In a traditional particle swarm optimization algorithm, a particle take a step towards an attractor from a current position, and the randomness is reflected in a step size. In the QPSO algorithm, an attractive potential is established at an attractor, which makes the attractor produce a bound state, and a particle in the bound state appears anywhere in space with a certain probability density. In this way, the particle can search in the whole feasible space, which ensures global convergence of the QPSO algorithm.

Embodiment 2

Figure 3:
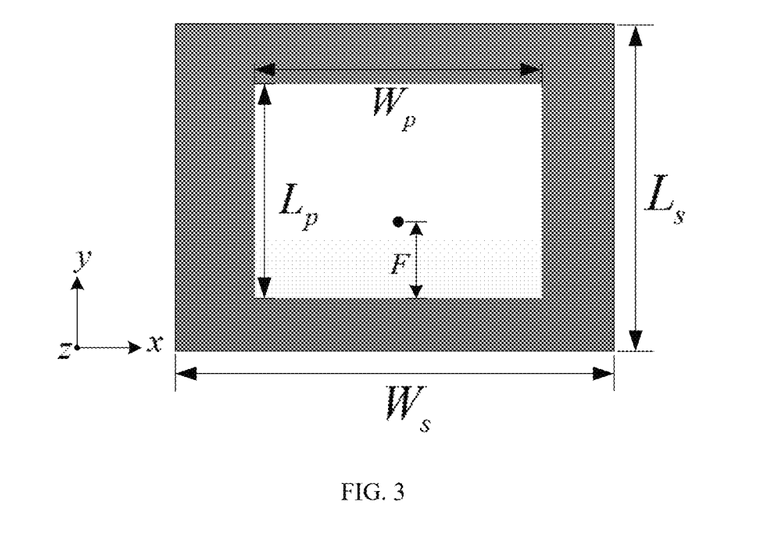
FIG. 3 illustrates a schematic diagram of a microstrip array element according to the efficient synthesis method for the radiation pattern of a conformal array antenna of the embodiment of the disclosure.

Based on the design method of the embodiment 1, a simulation process is carried out. Simulation parameters are as follows A microstrip antenna is used as a array element, as shown in FIG. 3. A dielectric substrate of the microstrip antenna has a dielectric constant of 2.2 and a thickness of the dielectric substrate is 0.66 mm. Geometric dimensions of the microstrip antenna is shown in Table 1.

TABLE 1

| Geometric dimensions of microstrip antenna | | | | |
| --- | --- | --- | --- | --- |
| $L_p$ (mm) | $W_p$ (mm) | $L_s$ (mm) | $W_s$ (mm) | F (mm) |
| 40.65 | 49.41 | 68.40 | 83.33 | 7.18 |

Figure 4:
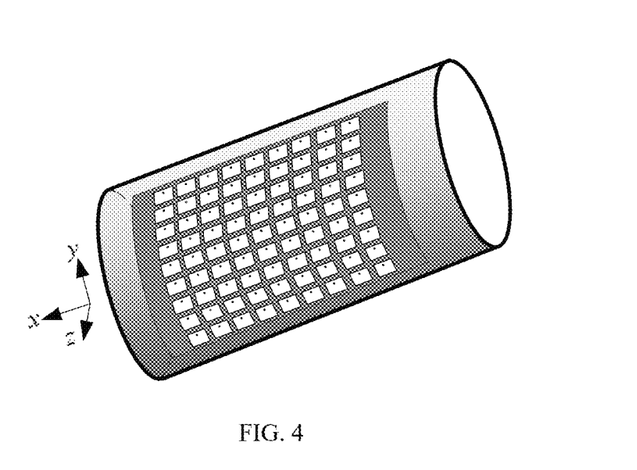
FIG. 4 illustrates a schematic diagram of a cylindrical microstrip conformal array according to an efficient synthesis method for a radiation pattern of a conformal array antenna of an embodiment of the disclosure.

A working frequency of the microstrip conformal array is 2.4 GHz, a cylinder radius is R=4λ, the array elements are evenly distributed and a spacing between the array elements in an axial direction and a spacing between the array elements in a circumferential direction are each 0.5λ, and an array size is 25×25=625 elements, as shown in FIG. 4.

A radius of a sphere is R=2.5λ, and the array elements are evenly distributed in a θ direction from −11.46° to 11.46° and φ direction from −80.22° to 80.22°, and an array spacing is 0.5λ, and an array size is 3×15=45 elements.

An arrangement and a working frequency of a half-wave dipole cylindrical conformal array are the same as those of a microstrip cylindrical conformal array, but the element form is different.

Embodiment 3

On the basis of the embodiment 2, simulation processes and corresponding results are as follows.

Figure 5:
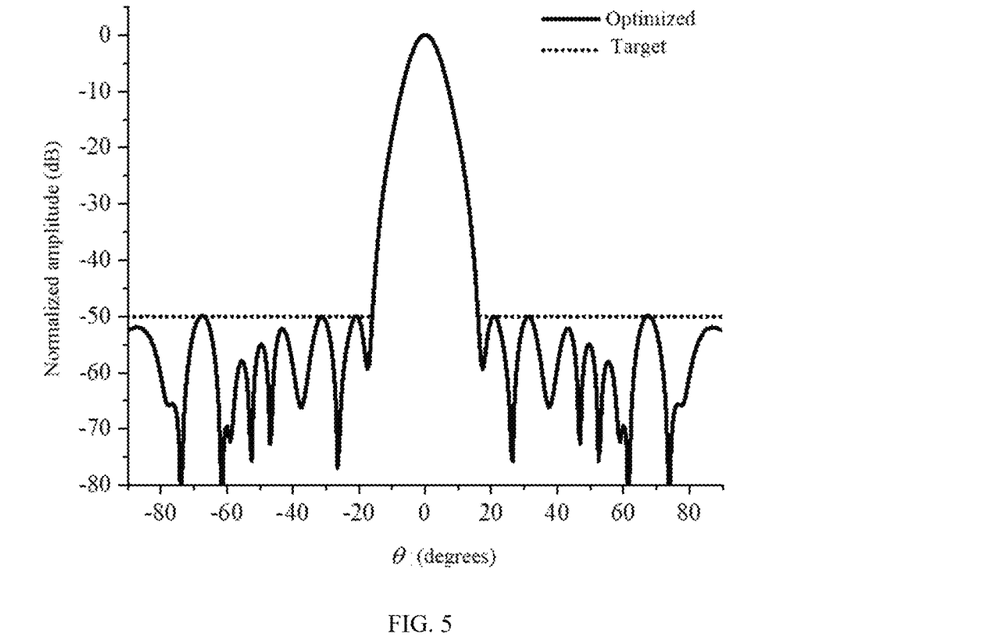
FIG. 5 illustrates a synthesis result of a low-sidelobe radiation pattern of a cylindrical microstrip conformal array obtained by using the efficient synthesis method for the radiation pattern of a conformal array antenna of the embodiment of the disclosure.
Figure 6:
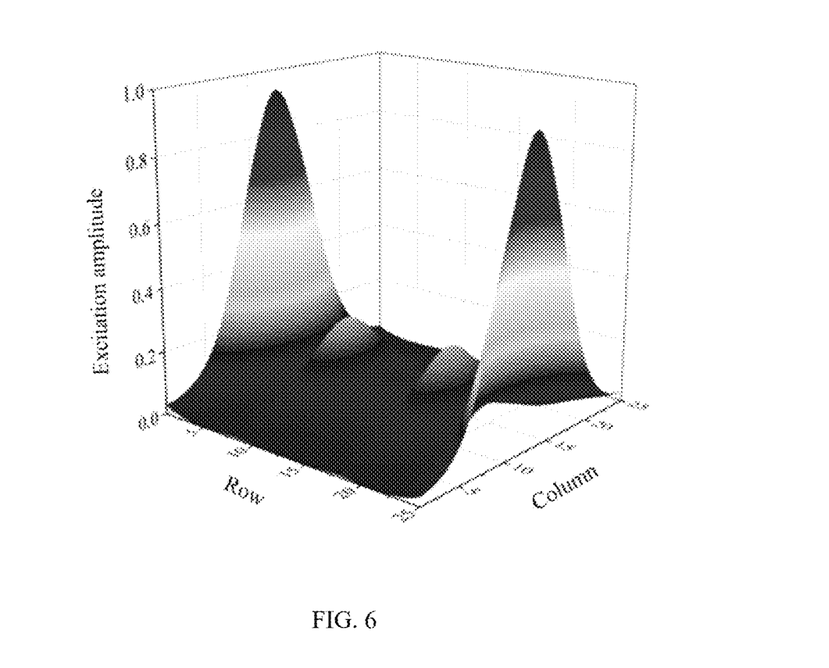
FIG. 6 illustrates an excitation amplitude corresponding to the synthesis result of the low-sidelobe radiation pattern of the cylindrical microstrip conformal array obtained by using the efficient synthesis method for the radiation pattern of a conformal array antenna of the embodiment of the disclosure.
Figure 7:
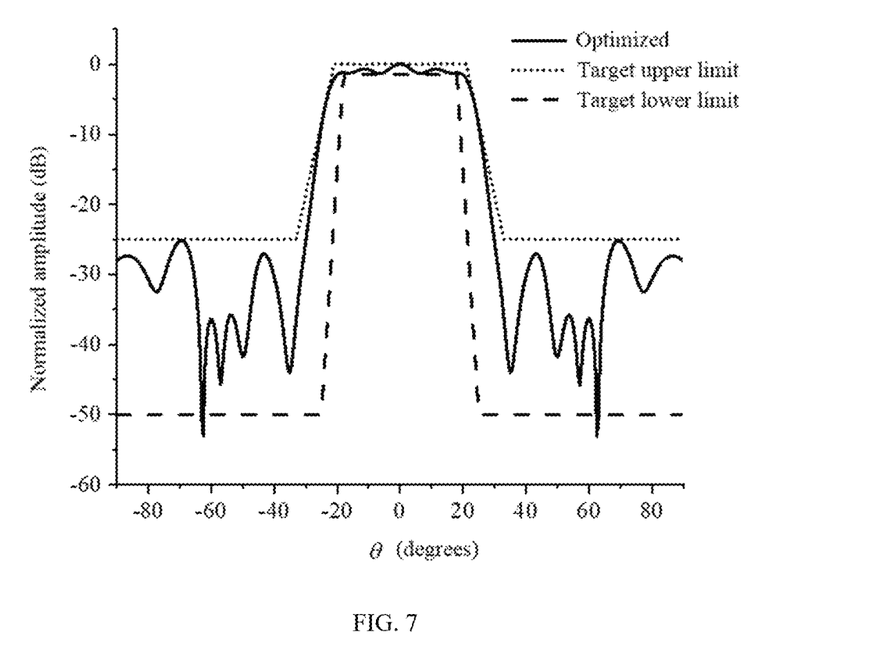
FIG. 7 illustrates a synthesis result of a flat-top beam of a cylindrical microstrip conformal array obtained by using the efficient synthesis method for the radiation pattern of a conformal array antenna of the embodiment of the disclosure.
Figure 8:
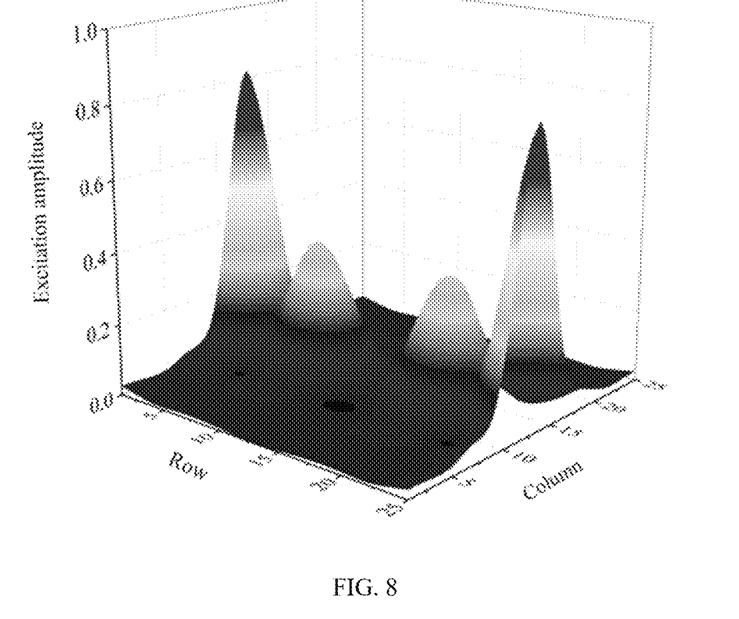
FIG. 8 illustrates an excitation amplitude corresponding to the synthesis result of the flat-top beam of a cylindrical microstrip conformal array obtained by using an efficient synthesis method for a radiation pattern of a conformal array antenna of an embodiment of the disclosure.

The low-sidelobe synthesis of the cylindrical conformal array antenna shown in FIG. 4 is realized in a section φ=0°. It is required that a maximum sidelobe level is not higher than −50 dB. FIG. 5 illustrates a low-sidelobe beam synthesis result corresponding to a section φ=0°. FIG. 6 illustrates a corresponding excitation amplitude distribution to the low-sidelobe beam synthesis result in FIG. 5. In the process of optimization, a problem dimension is 12, a population size is 60, and a maximum iteration step number is 200 steps. A flat-top beam is realized in θ∈(−25°~−28°, 25°~28°), and a maximum sidelobe level is required not to exceed −25 dB. FIG. 7 illustrates an optimization result corresponding to φ=0°, and FIG. 8 illustrates a corresponding excitation amplitude to the optimization result.

Figure 9:
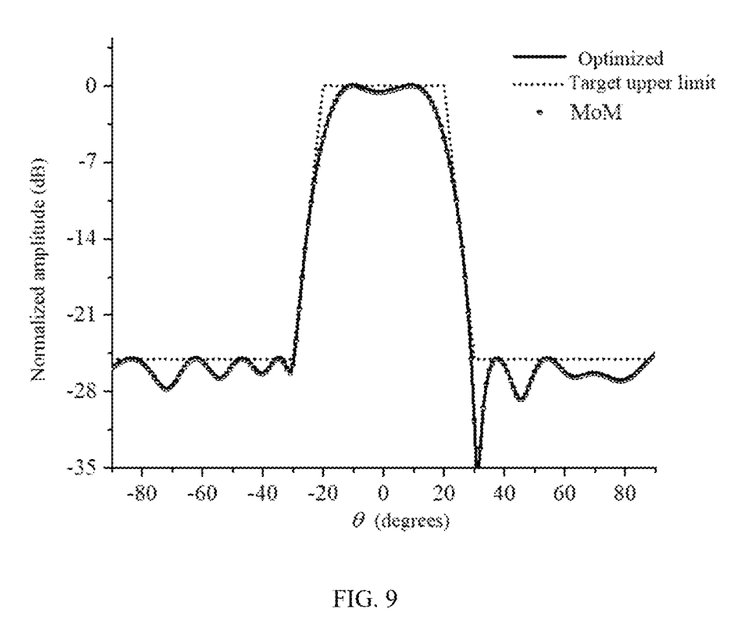
FIG. 9 illustrates a synthesis result of a flat-top beam of a spherical microstrip conformal array obtained by using the efficient synthesis method for the radiation pattern of a conformal array antenna of the embodiment of the disclosure.
Figure 10A:
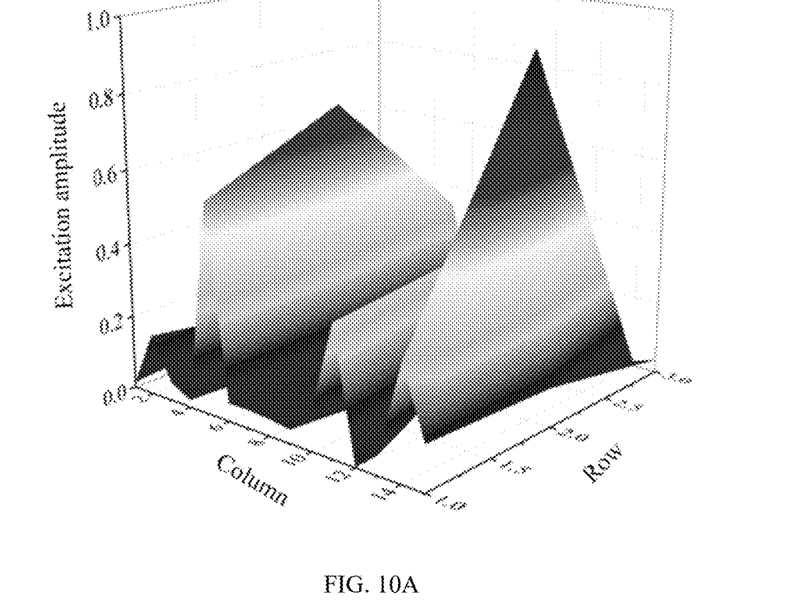
FIGS. 10A and 10B respectively illustrate an excitation amplitude and an excitation phase of the synthesis result the flat-top beam of the cylindrical microstrip conformal array obtained by using the efficient synthesis method for the radiation pattern of a conformal array antenna of the embodiment of the disclosure.
Figure 10B:
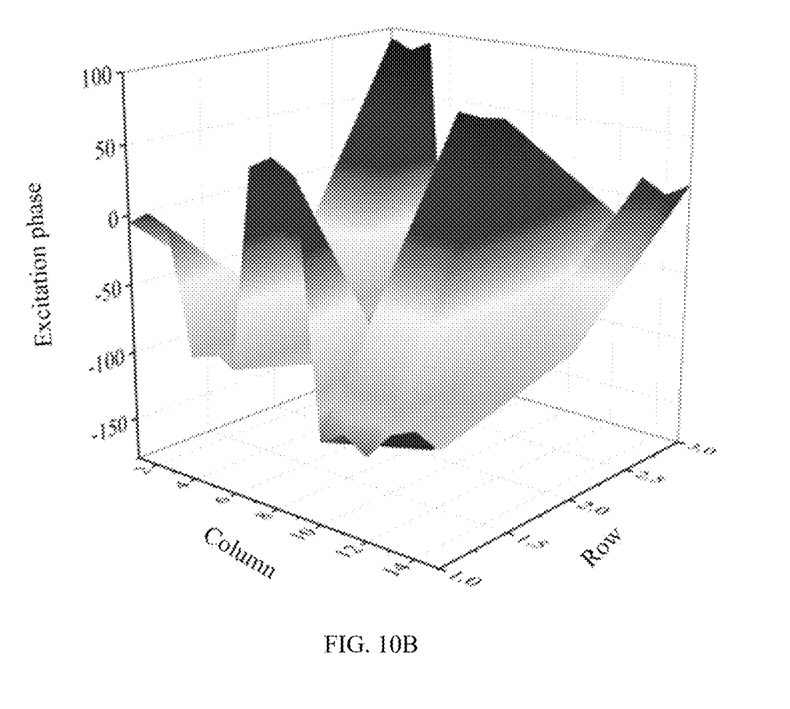
Figure 11:
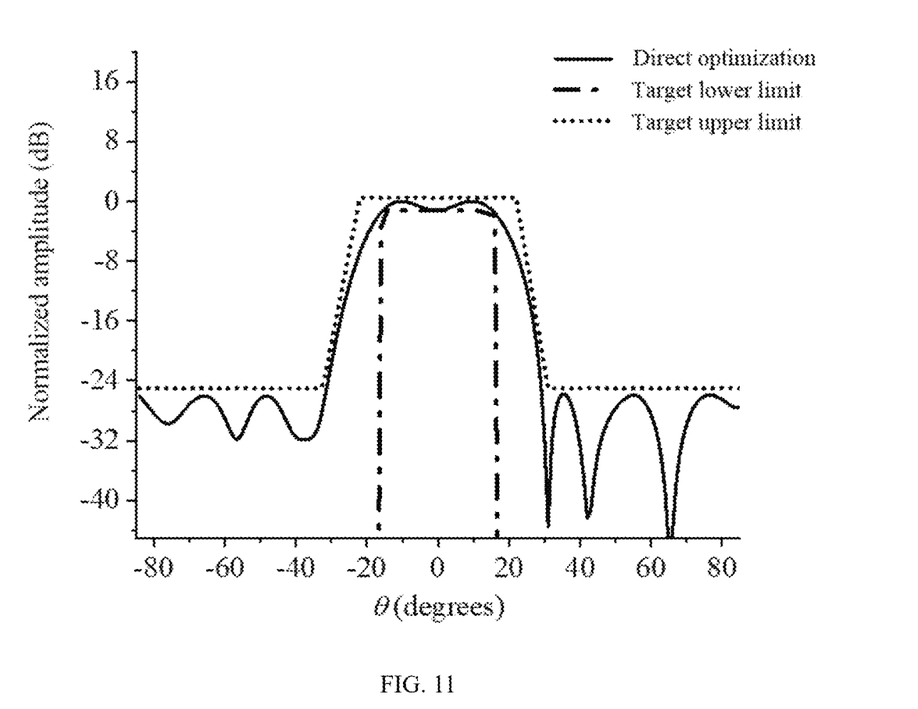
FIG. 11 illustrates illustrates a synthesis result of a flat-top beam of a spherical microstrip conformal array obtained by using a traditional method.

Taking a flat-top beam in 3×11 spherical conformal array θ∈(−20°, 20°) as an example, a maximum sidelobe level is required to be not greater than −25 dB. A problem dimension is 9. Considering that a number of array elements of the spherical conformal array is smaller and a truncation error of the excitation is relatively large after the discretization of a Fourier surface, a random factor is added to an excitation of each array element, in this case, an optimized problem dimension is 54, and the QPSO algorithm is still used, and it takes about 346.9 seconds to iterate for 1200 times. The QPSO algorithm is executed 15 times, and optimization results are averaged. An optimization result corresponding to φ=0° is given below, and an optimization result of a radiation pattern, corresponding excitation amplitude distribution and phase distribution are given in FIG. 9, FIG. 10A and FIG. 10B respectively. After optimization, an approximate flat-top range of a beam is θ∈(−18°, 18°), and a maximum sidelobe level is −25.2 dB, which basically meets the requirement. By observing FIG. 9, it can be seen that the radiation pattern obtained by the proposed method of the disclosure is consistent with that obtained by a method of moments (MoM) in Altair Feko™ (a comprehensive computational electromagnetics (CEM) software), which further verifies the effectiveness of the method of the disclosure. At the same time, the proposed method of the disclosure is compared with the direct optimization of excitation amplitudes and phases to illustrate its effectiveness of the proposed method of the disclosure. An optimization algorithm, a target radiation pattern, and an iteration step number are consistent with the aforementioned case. When the direct optimization of excitation amplitudes and phases is adopted, a problem dimension is 45×2=90, which is higher than that of the proposed method of the disclosure. FIG. 11 illustrates a radiation pattern obtained by the direct optimization of excitation amplitudes and phases, with the optimization taking approximately 2197.8 seconds. Comparing the results of the proposed method of the disclosure with those of the direct optimization, it is evident that the proposed method of the disclosure has a lower problem dimensionality and is more efficient in achieving the same objectives.

Figure 12:
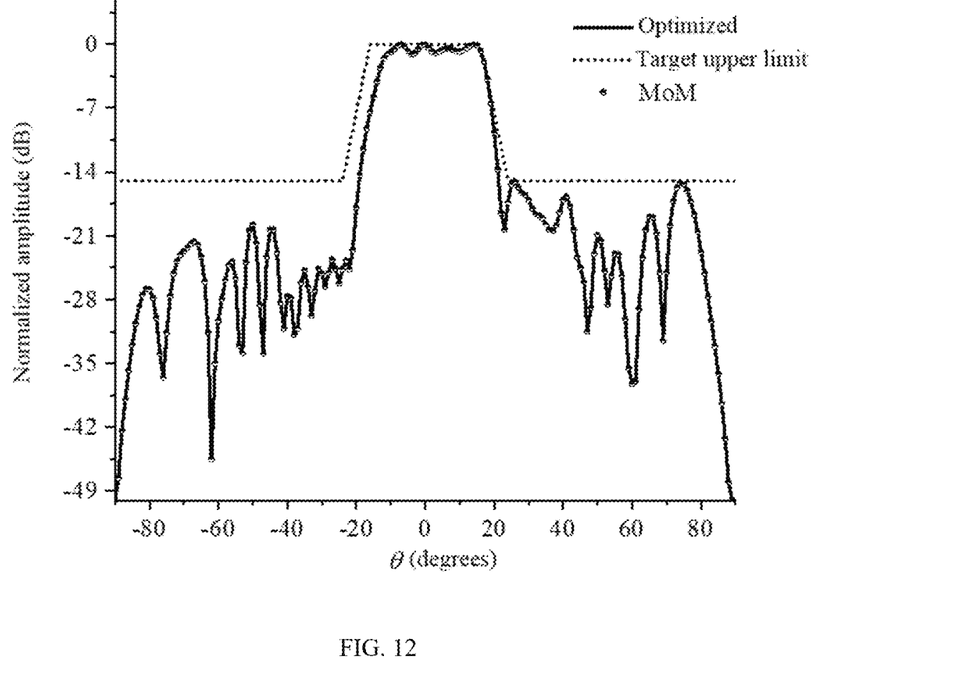
FIG. 12 illustrates a synthesis result of a flat-top beam of a cylindrical dipole conformal array obtained by using the efficient synthesis method for the radiation pattern of a conformal array antenna of the embodiment of the disclosure.
Figure 13A:
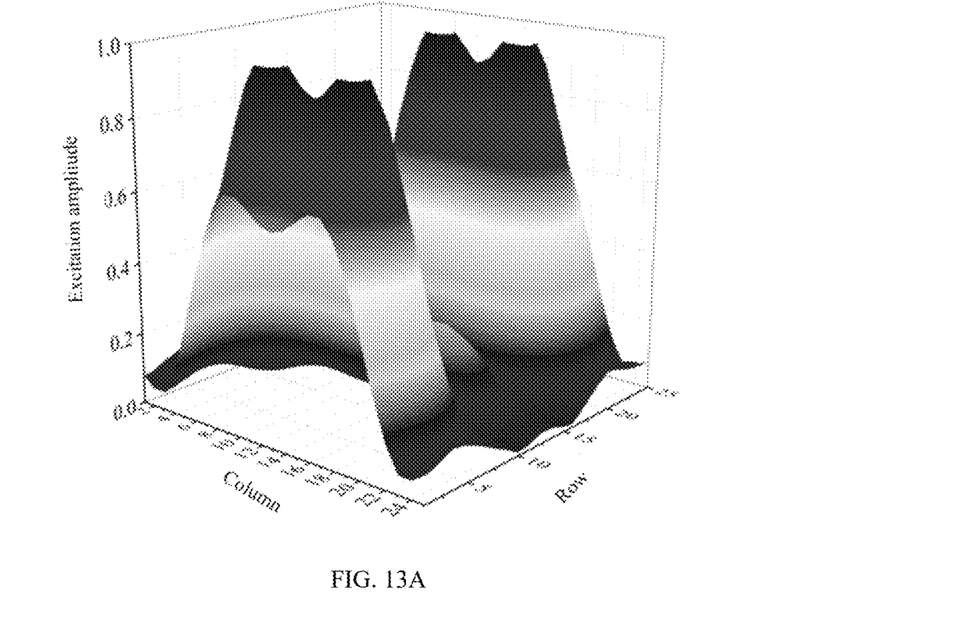
FIGS. 13A and 13B respectively illustrate an excitation amplitude and an excitation phase of the synthesis result of the flat-top beam of the cylindrical dipole conformal array obtained by using the efficient synthesis method for the radiation pattern of a conformal array antenna of the embodiment of the disclosure.
Figure 13B:
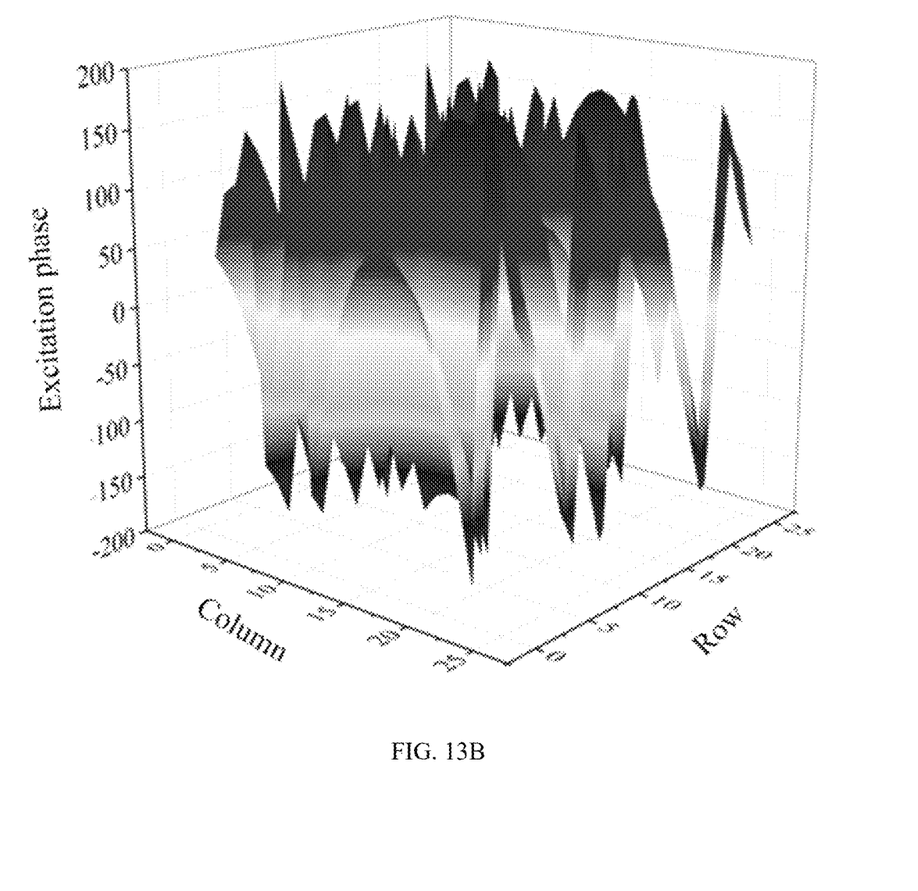

When using a half-wave dipole cylindrical conformal array, it is required that a approximate flat-top range is θ∈(−15°, 15°) and a maximum sidelobe level is not more than 15 dB. An iteration step number is 200 steps, which takes 541 seconds. An optimization result of a radiation pattern, corresponding excitation amplitude distribution and phase distribution are given in FIG. 12, FIG. 13A and FIG. 13B respectively, upon observation, it can be seen that the requirements are essentially met.

What is claimed is:

1. A synthesis method for a radiation pattern of a conformal array antenna, the synthesis method comprising:
  step 1, establishing a field analysis model of the conformal array antenna;
    wherein in the step 1, the field analysis model of the conformal array antenna is expressed by a formula (1):

$$E = \sum_{n=1}^{N} I_n T_n f_n(\theta, \varphi) e^{jk\vec{r_n}\cdot\vec{r}}, \quad (1)$$

where E represents a far-filed of the conformal array antenna; $T_n$ represents a rotation matrix of an n-th array element of N array elements of the conformal array antenna; $f_n(\theta,\varphi)$ represents a polarization component of a vector radiation pattern of the n-th array element in a far-field observation direction (θ, φ); $I_n$ represents a complex excitation of the n-th array element; k represents a spatial propagation constant, $k=2\pi/\lambda$, λ represents a wavelength; $\vec{r_n}$ represents a position vector of the n-th array element; $\vec{r}$ represents an unit vector of the far-field observation direction (θ,φ); j represents an imaginary unit; θ represents an included angle between the far-field observation direction (θ,φ) and a positive position of a coordinate axis z; and φ represents an included angle between the far-field observation direction (θ, φ) and a positive position of a coordinate axis x;
  step 2, determining an aperture field distribution principle suitable for the conformal array antenna, and expanding distribution of an excitation I of an arbitrary curved surface source in a spherical coordinate system according to the aperture field distribution principle;
    wherein in the step 2, the aperture field distribution principle suitable for the conformal array antenna comprises:
      a. an excitation distribution function of the arbitrary curved surface source is continuous, because a curved surface corresponding to the arbitrary curved surface source is continuous, the excitation distribution function also is continuous;
      b. the excitation distribution function is bounded, because the excitation distribution function has upper and lower limits; and
      c. the excitation distribution function is integrable, because an integral of a product of the excitation and a spatial phase term is a field distribution, the excitation distribution function is integrable;
    wherein in the step 2, the expanded distribution of the excitation I of the arbitrary curved surface source in the spherical coordinate system is expressed by a formula (2):

$$I(r,\theta,\varphi) = \sum_{-p}^{p}\sum_{-q}^{q}\sum_{-s}^{s} A_{(p,q,s)} \exp\left[j\frac{p\pi r u}{L_x}\right]\exp\left[j\frac{q\pi r v}{L_y}\right]\exp\left[j\frac{s\pi r w}{L_z}\right], \quad (2)$$

where r represents a distance between any point on the arbitrary cured surface source and a coordinate origin of the spherical coordinate system; $L_x$, $L_y$ and $L_z$ represent projection lengths of the arbitrary cured surface source on coordinate axes x, y, and z of the spherical coordinate system, respectively; u=sin θ cos φ, v=sin θ sin φ, and w=cos θ; and a (p, q, s)-th Fourier expansion coefficient is $A_{(p,q,s)}$; and
  step 3, establishing an optimization model for the radiation pattern of the conformal array antenna, and performing synthesis of the radiation pattern of the conformal array antenna according to the optimization model;
    wherein in the step 3, the optimization model for the radiation pattern of the conformal array antenna is expressed by a formula (3):

Find $A=[A_{(1,1,1)} A_{(p,q,s)} \ldots A_{(P,Q,S)}]$

Min. $f(A)=10 \log|E-E_{tar}|$

S.T.$A \in [\overline{A}, \underline{A}]$ (3), where A represents a vector composed of the Fourier expansion coefficient $A_{(p,q,s)}$, named a control parameter vector; P, Q and S respectively represent total numbers of Fourier expansion coefficients along the coordinate axes x, y, and z; $\overline{A}$ and $\underline{A}$ represent upper and lower limits of the control parameter vector respectively; and $E_{tar}$ represents a target field;
  wherein the performing synthesis of the radiation pattern of the conformal array antenna according to the optimization model comprises:
    substituting the vector composed of the Fourier expansion coefficient $A_{(p,q,s)}$ into the formula (2) to obtain the excitation I of the arbitrary curved surface source;
    performing discretization on the excitation I of the arbitrary curved surface source to thereby obtain the complex excitation $I_n$ of the n-th array element; and
    substituting the complex excitation $I_n$ of the n-th array element into the formula (1) to obtain the far-field E of the conformal array antenna.

* * * * *